United States Patent
Liu et al.

(10) Patent No.: US 8,432,602 B2
(45) Date of Patent: Apr. 30, 2013

(54) CHROMATIC ELEMENT AND CHROMATIC DISPLAY DEVICE USING THE SAME

(75) Inventors: Peng Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 415 days.

(21) Appl. No.: 12/913,977

(22) Filed: Oct. 28, 2010

(65) Prior Publication Data

US 2011/0317244 A1    Dec. 29, 2011

Related U.S. Application Data

(63) Continuation-in-part of application No. 12/822,236, filed on Jun. 24, 2010, now Pat. No. 8,144,383.

(30) Foreign Application Priority Data

Aug. 25, 2010    (CN) .......................... 2010 1 0262550

(51) Int. Cl.
    *G02F 1/153*    (2006.01)

(52) U.S. Cl.
    USPC .......................................................... 359/267

(58) Field of Classification Search .................. 359/242, 359/265–274, 277
    See application file for complete search history.

(56) References Cited

U.S. PATENT DOCUMENTS

2010/0220379 A1*  9/2010  Liu et al. ...................... 359/288
2011/0157672 A1   6/2011  Liu et al.

FOREIGN PATENT DOCUMENTS

CN           102116942 A       7/2011

* cited by examiner

*Primary Examiner* — James Jones
(74) *Attorney, Agent, or Firm* — Altis Law Group, Inc.

(57) ABSTRACT

A chromatic element includes a sealed enclosure, a first heating element, a chromatic material layer, and a second heating element. The sealed enclosure includes an upper sheet and a lower sheet, and defines a room between the upper sheet and the lower sheet. The upper sheet is semitransparent. The first heating element is located on the upper sheet. The second heating element is located on the lower sheet. The chromatic material layer is located in the room. The location of the chromatic layer changes by heat from the first heating element or the second heating element.

20 Claims, 9 Drawing Sheets

CHROMATIC ELEMENT AND CHROMATIC DISPLAY DEVICE USING THE SAME

RELATED APPLICATIONS

This application claims all benefits accruing under 35 U.S.C. §119 from China Patent Application No. 201010262550.2, filed on Aug. 25, 2010 in the China Intellectual Property Office, the disclosure of which is incorporated herein by reference. This application is a continuation-in-part application of U.S. patent application Ser. No. 12/822236, filed Jun. 24, 2010 entitled, "CHROMATIC ELEMENT AND CHROMATIC DISPLAY DEVICE USING THE SAME."

BACKGROUND

1. Technical Field

The present disclosure generally relates to a chromatic device and a chromatic display apparatus incorporating carbon nanotubes.

2. Description of Related Art

E-paper is a form of display without the use of a back light module. At present, E-paper technology is primarily based on electrophoresis, wherein electric particles are used. The movement of the electric particles allows different images to be formed in the display. However, e-paper is still restricted to black and white images and cannot show color images.

What is needed, therefore, is a display device without a back light module that can overcome the above-described shortcomings

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
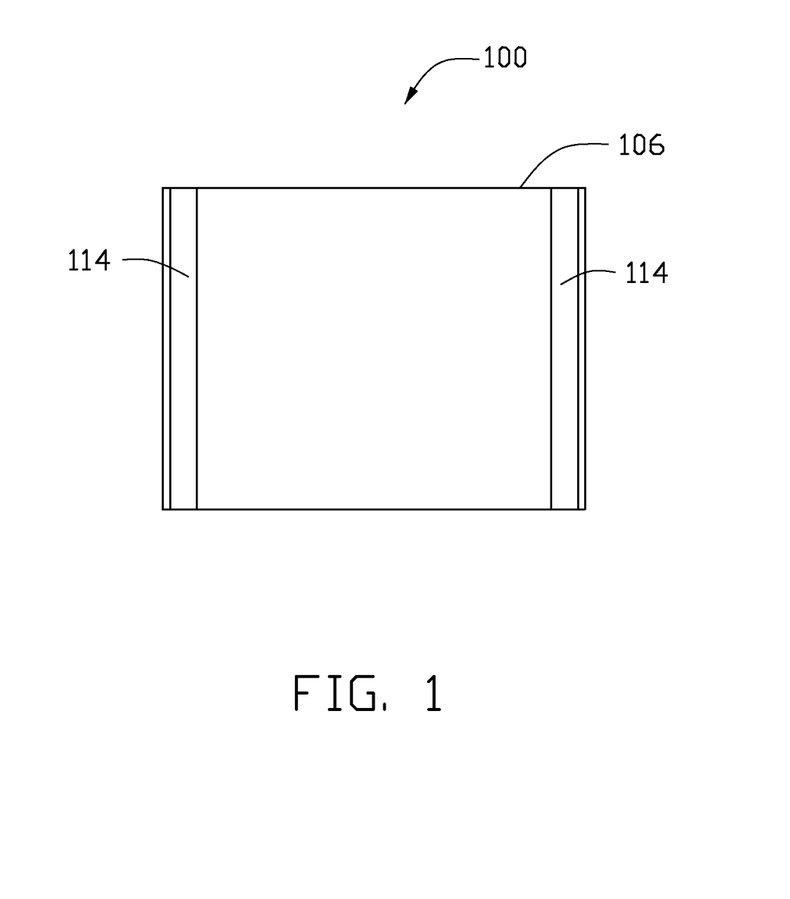
FIG. 1 is a top plan view of one embodiment of a chromatic element.
Figure 2:
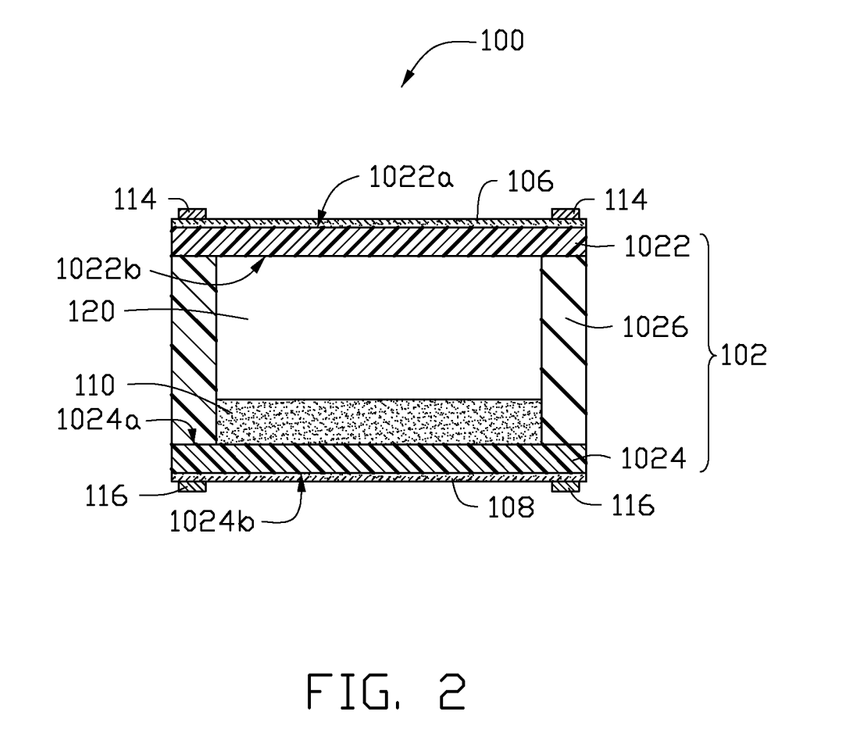
FIG. 2 is a cross-sectional side view of the chromatic element in FIG. 1.

Referring to FIGS. 1 and 2, a chromatic element 100 of one embodiment is shown. The chromatic element 100 includes a sealed enclosure 102, a first heating element 106, a second heating element 108, and a chromatic material layer 110. The sealed enclosure 102 includes an upper sheet 1022, a lower sheet 1024, and defines a room 120 between the upper sheet 1022 and the lower sheet 1024. The chromatic material layer 110 is located in the room 120. The chromatic material layer 110 is in a solid state at room temperature and can change into a gas state at a temperature higher than room temperature. The first heating element 106 is positioned on the upper sheet 1022. The second heating element 108 is positioned on the lower sheet 1024. The first heating element 106 and the second heating element 108 are both configured to heat the chromatic material layer 110. The first heating element 106 and the second heating element 108 asynchronously produce heat, and the chromatic material layer 110 moves between the first heating element 106 and the second heating element 108 in response to the heat produced by the first heating element 106 and the second heating element 108. The chromatic element 100 further includes at least two first electrodes 114 and at least two second electrodes 116. The at least two first electrodes 114 are electrically connected with the first heating element 106. The at least two second electrodes 116 are electrically connected with the second heating element 108.

A shape of the sealed enclosure 102 can be cuboid or cylindrical. In one embodiment according to FIG. 2, the sealed enclosure 102 of the thermal-chromatic element 100 has a cube structure. The sealed enclosure 102 further includes four side sheets 1026 located between the upper sheet 1022 and the lower sheet 1024 to form the cubic sealed enclosure 102. The upper sheet 1022 includes a first upper surface 1022a and a first lower surface 1022b opposite with the first upper surface 1022a. The first lower surface 1022b is positioned in the room 120. The lower sheet 1024 includes a second upper surface 1024a and a second lower surface 1024b, and the second upper surface 1024a is positioned in the room 120. At least one of the first upper surface 1022a and the first lower surface 1022b is a rough surface. In one embodiment, the first upper surface 1022a is a rough surface, and the first lower surface 1022b is substantially slick. In another embodiment, the first upper surface 1022a is substantially slick, and the first lower surface 1022b is a rough surface. Because at least one of the first upper surface 1022a and the first lower surface 1022b is a rough surface, the upper sheet 1022 is semitransparent. Light transmittance can be in a range from about 40% to about 80%. In one embodiment, the upper sheet 1022 is a frosted glass, and the first lower surface 1022b is the rough surface. The rough surface of the upper sheet 1022 can be formed by etching or abrading. A material of the upper sheet 1022 can be glass or transparent polymer. The transparent polymer includes polyethylene terephthalate, polyimide, polystyrene, polypropylene, polyethylene, polychloroprene, and PVC. The lower sheet 1024 and the side sheets 1026 are made of insulated materials, such as ceramic, resin, or plastic.

The first heating element 106 is located on a surface of the upper sheet 1022. The first heating element 106 can be located on the first upper surface 1022a or the first lower surface 1022b of the upper sheet 1022. The first heating element 106 should be transparent and can be an ITO film or a carbon nanotube layer structure.

The second heating element 108 is located on the second upper surface 1024a or the second lower surface 1024b of the lower sheet 1024. The second heating element 108 can be a metal film, an ITO film, or a carbon nanotube layer structure. In the present embodiment according to FIGS. 1 and 2, the first heating element 106 is located on the first upper surface 1022a of the upper sheet 1022, and the second heating element 108 is located on the second lower surface 1024b of the lower sheet 1024.

The carbon nanotube layer structure includes a plurality of carbon nanotubes joined by van der Waals attractive force therebetween. The carbon nanotube layer structure can be a substantially pure structure of carbon nanotubes, with few impurities. The carbon nanotubes can be used to form many different structures and provide a large specific surface area. The carbon nanotube layer structure can be a freestanding structure, that is, the carbon nanotube layer structure can be supported by itself without a substrate. For example, if at least one point of the carbon nanotube layer structure is held, the entire carbon nanotube layer structure can be lifted without being destroyed. The heat capacity per unit area of the carbon nanotube layer structure can be less than $2 \times 10^{-4}$ J/m$^2$*K. In one embodiment, the heat capacity per unit area of the carbon nanotube layer structure is less than or equal to $1.7 \times 10^{-6}$ J/m$^2$*K. Because the heat capacity of the carbon nanotube layer structure is very low, the temperature of the first heating element 106 or the second heating element 108 can rise and fall quickly, and has a high response heating speed. Thus, the first heating element 106 or the second heating element 108 has a high heating efficiency and accuracy. In addition, because the carbon nanotube layer structure can be substantially pure, the carbon nanotubes are not easily oxidized and the lifespan of the first heating element 106 and/or the second heating element 108 will be relatively long. Furthermore, because the carbon nanotubes have a low density, about 1.35 g/cm$^3$, the first heating element 106 or the second heating element 108 is light. The temperature quickly rises in the first heating element 106 or the second heating element 108 using the carbon nanotube layer structure and the chromatic element 100 responds quickly because the heat capacity of the carbon nanotube layer structure is very low. The carbon nanotube layer structure with a plurality of carbon nanotubes also has a larger specific surface area because the carbon nanotube has a large specific surface area. If the specific surface of the carbon nanotube layer structure is large enough, the carbon nanotube layer structure is adhesive and can be directly applied to a surface.

The carbon nanotubes in the carbon nanotube layer structure can be orderly or disorderly arranged. The term 'disordered carbon nanotube layer structure' refers to a structure where the carbon nanotubes are arranged along different directions, and the aligning directions of the carbon nanotubes are random. The number of the carbon nanotubes arranged along each different direction can be almost the same (e.g. uniformly disordered). The disordered carbon nanotube layer structure can be isotropic, namely the carbon nanotube layer structure has properties identical in all directions of the carbon nanotube layer structure. The carbon nanotubes in the disordered carbon nanotube layer structure can be entangled with each other.

The carbon nanotube layer structure including ordered carbon nanotubes is an ordered carbon nanotube layer structure. The term 'ordered carbon nanotube layer structure' refers to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube layer structure 164 can be selected from single-walled, double-walled, and/or multi-walled carbon nanotubes.

The carbon nanotube layer structure can be a film structure with a thickness ranging from about 0.5 nanometers (nm) to about 1 mm. The carbon nanotube layer structure can include at least one carbon nanotube film.

Figure 3:
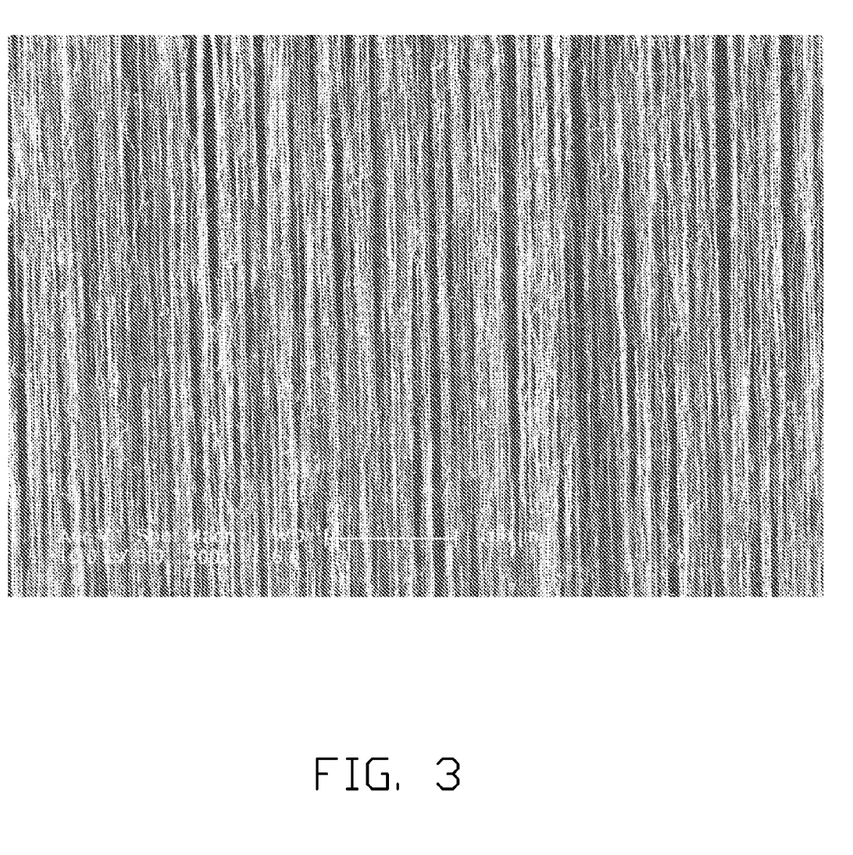
FIG. 3 is a Scanning Electron Microscope (SEM) image of a drawn carbon nanotube film.
Figure 4:
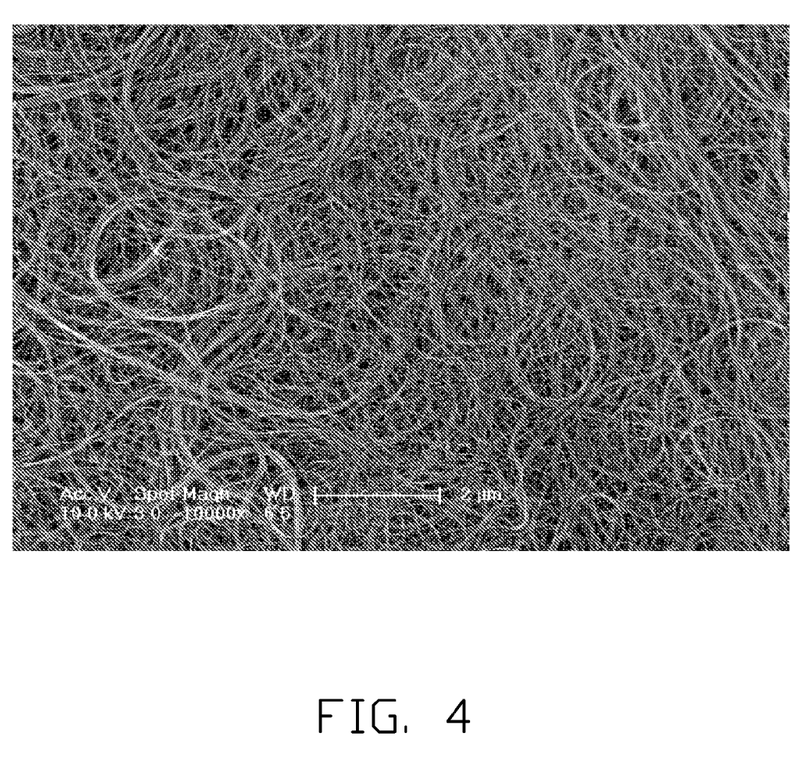
FIG. 4 is an SEM image of a flocculated carbon nanotube film.

In one embodiment, the carbon nanotube film is a drawn carbon nanotube film. A film can be drawn from a carbon nanotube array, to obtain a drawn carbon nanotube film. Overall, the drawn carbon nanotube film includes a plurality of successive and oriented carbon nanotubes joined end-to-end by van der Waals attractive force therebetween. The drawn carbon nanotube film is a free-standing film. Each drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. Referring to FIG. 3, some variations can occur in the drawn carbon nanotube film. The carbon nanotubes in the drawn carbon nanotube film are oriented along a preferred orientation. The carbon nanotube film can be treated with an organic solvent to increase the mechanical strength and toughness of the carbon nanotube film and reduce the coefficient of friction of the carbon nanotube film. The thickness of the carbon nanotube film can range from about 0.5 nm to about 100 μm.

The carbon nanotube layer structure can include at least two stacked carbon nanotube films. In other embodiments, the carbon nanotube layer structure can include two or more coplanar carbon nanotube films, and can include layers of coplanar carbon nanotube films. Additionally, if the carbon nanotubes in the carbon nanotube film are aligned along one preferred orientation (e.g., the drawn carbon nanotube film), an angle can exist between the orientations of carbon nanotubes in adjacent films, whether stacked or adjacent. Adjacent carbon nanotube films can be joined by only the van der Waals attractive force therebetween. The number of the layers of the carbon nanotube films is not limited. However, the thicker the carbon nanotube layer structure, the smaller the specific surface area. An angle between the aligned directions of the carbon nanotubes in two adjacent carbon nanotube films can range from about 0 degrees to about 90 degrees. If the angle between the aligned directions of the carbon nanotubes in adjacent carbon nanotube films is greater than 0 degrees, the carbon nanotubes in the carbon nanotube layer structure define a microporous structure. The carbon nanotube layer structure in an embodiment employing these films will have a plurality of micropores. Stacking the carbon nanotube films will also add to the structural integrity of the carbon nanotube layer structure.

Figure 5:
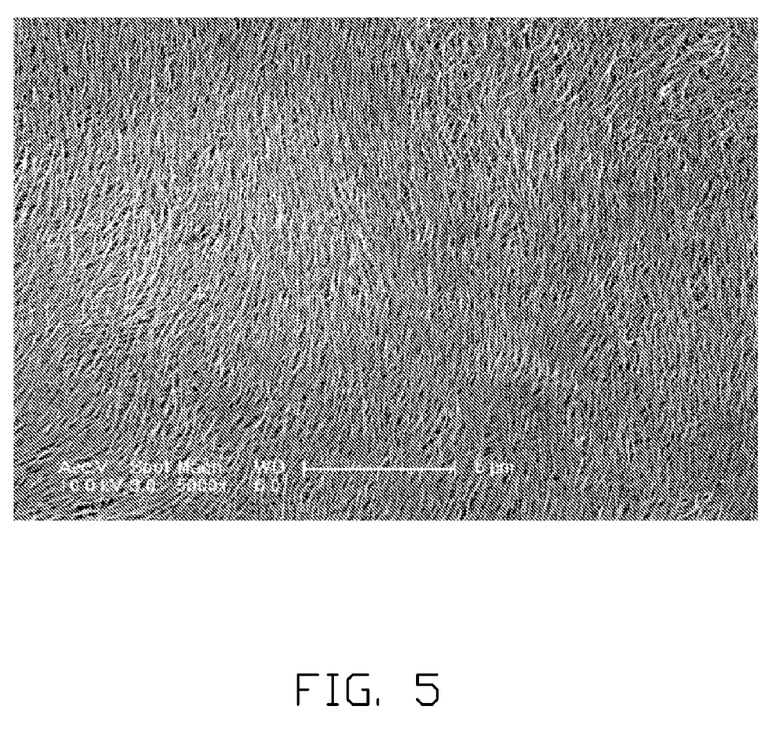
FIG. 5 is an SEM image of a pressed carbon nanotube film.

In other embodiments, the carbon nanotube film can be a flocculated carbon nanotube film. Referring to FIG. 5, the flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. It is noteworthy that the flocculated carbon nanotube film is very porous. Sizes of the micropores can be less than 10 μm. The porous nature of the flocculated carbon nanotube film will increase the specific surface area of the carbon nanotube layer structure. Further, due to the carbon nanotubes in the carbon nanotube layer structure being entangled with each other, the carbon nanotube layer structure employing the flocculated carbon nanotube film has excellent durability, and can be fashioned into desired shapes with a low risk to the integrity of the carbon nanotube layer structure. The thickness of the flocculated carbon nanotube film can range from about 0.5 nm to about 1 mm.

Figure 6:
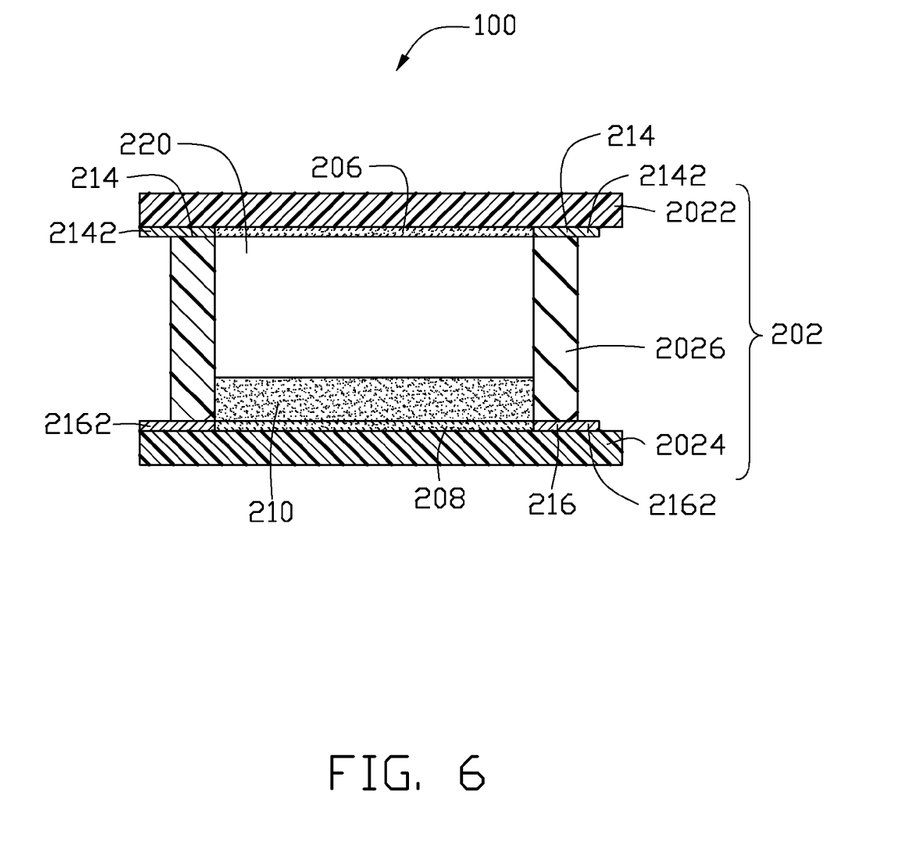
FIG. 6 is a cross-sectional side view of a chromatic element according to another embodiment.

In other embodiments, the carbon nanotube film can be a pressed carbon nanotube film. Referring to FIG. 6, the carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. If the carbon nanotubes in the pressed carbon nanotube film are arranged along different directions, the carbon nanotube layer structure can be isotropic. Here, "isotropic" means the carbon nanotube film has properties identical in all directions substantially parallel to a surface of the carbon nanotube film. The thickness of the pressed carbon nanotube film ranges from about 0.5 nm to about 1 mm.

The at least two first electrodes 114 are used to electrically connect the first heating element 106 and the output circuit and make the first heating element 106 produce Joule heat. The at least two first electrodes 114 can be fixed on the surface of the first heating element 106 by a conductive adhesive (not shown). The at least two first electrodes 114 are made of a conductive material. The shapes of the at least two first electrodes 114 are not limited and can be lamellar-shaped, rod-shaped, wire-shaped, or block-shaped. The cross sectional shape of the two first electrodes 114 can be round, square, trapezium, triangular, or polygonal. The thickness of the two first electrodes 114 can be any size, depending on the design, and can be about 1 micrometer to about 1 centimeter. In the present embodiment as shown in FIGS. 1 and 2, the two first electrodes 114 both have a linear shape, and are located on the surface of the first heating element 106. The two first electrodes 114 are substantially parallel with each other. In one embodiment, when the first heating element 106 includes the carbon nanotube layer structure having a plurality of carbon nanotubes arranged in a same direction, the axes of the carbon nanotubes can be substantially perpendicular to the two first electrodes 114. Furthermore, the two first electrodes 114 can be electrically connected with the output circuit by two electrodes wires (not shown).

The at least two second electrodes 116 are used to electrically connect the second heating element 108 and the output circuit to make the second heating element 108 produce Joule heat. The at least two second electrodes 116 can be fixed on the surface of the second heating element 108 by conductive adhesive (not shown). The material and the shape of the second electrodes 116 can be the same as the first electrodes 114. The relationship between the second electrodes 116 and the second heating element 108 can be the same as the relationship between the first electrodes 114 and the first heating element 106. Further, the two first electrodes 114 can be electrically connected with the output circuit by two electrodes wires (not shown).

The chromatic material layer 110 can be supported by the lower sheet 1024. In one embodiment, the second heating element 108 is located on the second upper surface 1024a, and the chromatic material layer 110 can be located on the second heating element 108. In another embodiment, if the second heating element 108 is located on the second lower surface 1024b, the chromatic material layer 110 can be located on the second upper surface 1024a. The chromatic material layer 110 can be solid and become gas when it reaches its gasification temperature. Particularly, a material of the chromatic material layer 110 sublimates easily, such as iodine or naphthalin. The chromatic material layer 110 can be solid dye, such as indigo or methyl violet.

The working principle of the chromatic element 100 is based on location change of the chromatic material layer 110 under heat generated by the first heating element 106 and the second heating element 108 discussed in detail below. In a non-displaying status of the chromatic element 100, the colorful material layer 110 is supported by the lower sheet 1024 of the sealed enclosure 102 and away from the upper sheet 1022. Because the upper sheet 1022 is semitransparent, the chromatic material layer 110 is not visible from the upper sheet 1022. If a voltage is applied on the second heating element 108 with the two second electrodes 116, the heating element 108 will heat the chromatic material layer 110 by the lower sheet 1024. When the chromatic material layer 110 is heated to a temperature higher than its gasification temperature, it will become a gas and flow onto the first lower surface 1022b of the upper sheet 1022. Because a temperature of the upper sheet 1022 is low, the chromatic material layer 110 will become solid again, attach on the first lower surface 1022b of the upper sheet 1022, and become visible from the upper sheet 1022. If a voltage is applied to the two first electrodes 114 and the voltage applied on the two second electrodes 116 is turned off, the first heating element 106 heats the chromatic material layer 110 until it becomes gas. The chromatic material layer 110 will flow onto the second upper surface 1024a of the lower sheet 1024 and the chromatic material layer 110 will not visible from the upper sheet 1022. Because the chromatic material layer 110 is colorful, the chromatic material element 100 can show many colors.

Referring to FIG. 6, a chromatic element 200 according to another embodiment is provided. The chromatic element 200 includes a sealed enclosure 202, a first heating element 206, a second heating element 208, a chromatic material layer 210, and a room 220. The chromatic element 200 further includes at least two first electrodes 214 and at least two second electrodes 216. The sealed enclosure 202 includes an upper sheet 2022, a lower sheet 2024, and four side sheets 2026. The upper sheet 2022 includes a first upper surface (not labeled) and a second lower surface (not labeled). The lower sheet 2024 includes a second upper surface (not labeled) and a second lower surface (not labeled).

The first heating element 206 is located on the first lower surface of the upper sheet 2022. The second heating element 208 is located on the second upper surface of the lower sheet 2024. The first heating element 206 can come in contact with the chromatic material layer 210. The second heating element 208 can come in contact with the absorbing layer 212. Each of the first electrode 214 includes a first extending portion 2142 extending to out of the sealed enclosure 202. Each of the second electrodes 216 includes a second extending portion 2162 extending out of the sealed enclosure 202. The first extending portion 2142 can cause the first heating element 206 to electrically connect with the output circuit easily. The second extending portion 2162 enables the second heating element 208 to electrically connect with the output circuit easily.

Other characteristics of the chromatic element 200 are similar to the chromatic element 100 disclosed above.

Figure 7:
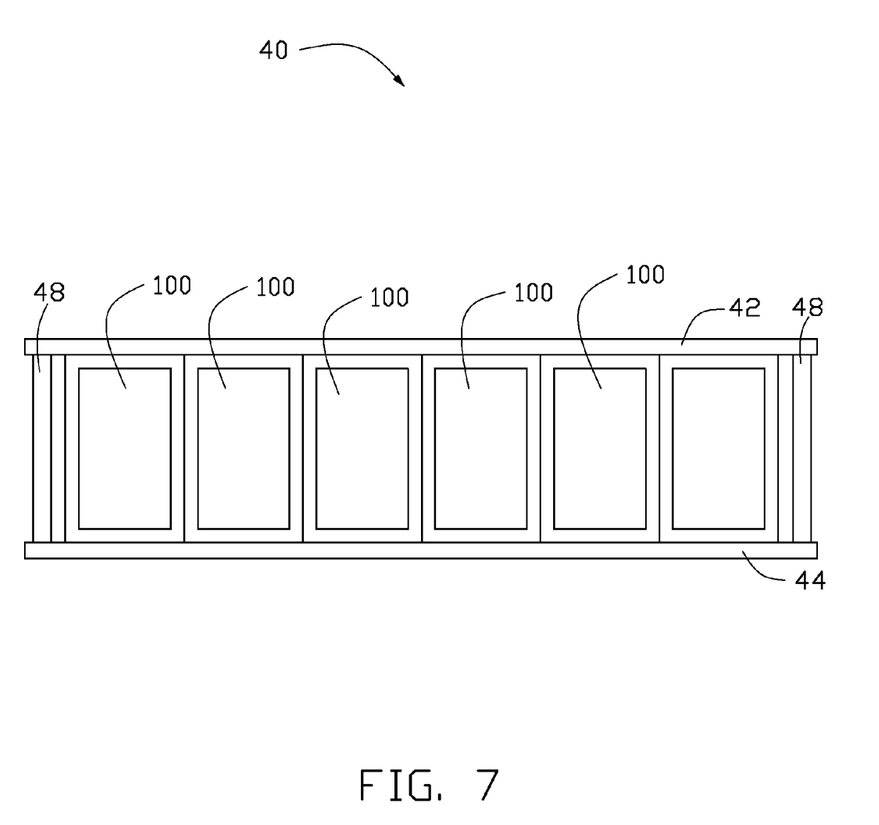
FIG. 7 is a side view of a chromatic display device according to still another embodiment.

Referring to FIG. 7, a chromatic display device 40 according to one embodiment is provided. The chromatic display device 40 includes a first electrode sheet 42, a second electrode sheet 44 and a plurality of chromatic elements 100 located between the first electrode sheet 42 and the second electrode 44.

Figure 8:
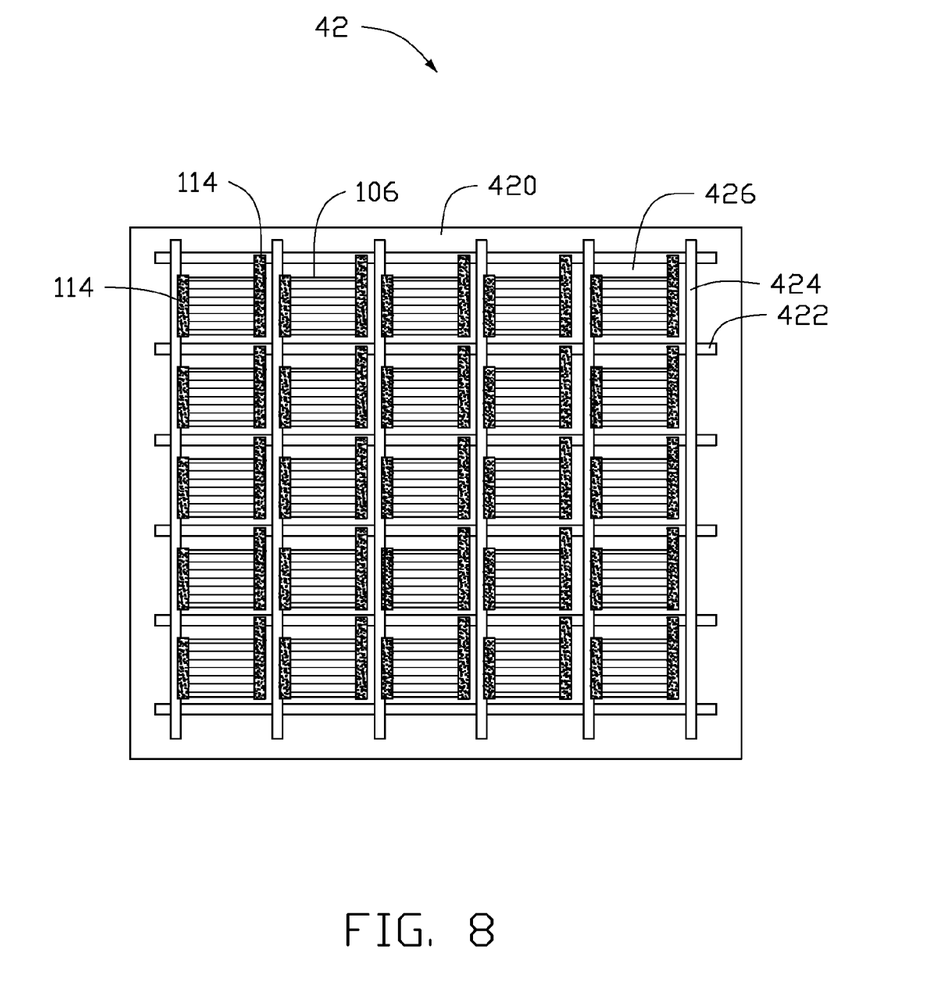
FIG. 8 is a top plan view of a first electrode sheet used in the chromatic display device in FIG. 7.

Referring to FIG. 8, the first electrode sheet 42 is a transparent sheet and includes a first surface 420. The first electrode sheet 42 includes a plurality of first row electrodes 422 and a plurality of first line electrodes 424, located on the first surface 420. The plurality of first row electrodes 422 and the plurality of first line electrodes 424 are insulated from each other and crossed with each other to define an electrode cell including a plurality of first electrode cells 426.

Figure 9:
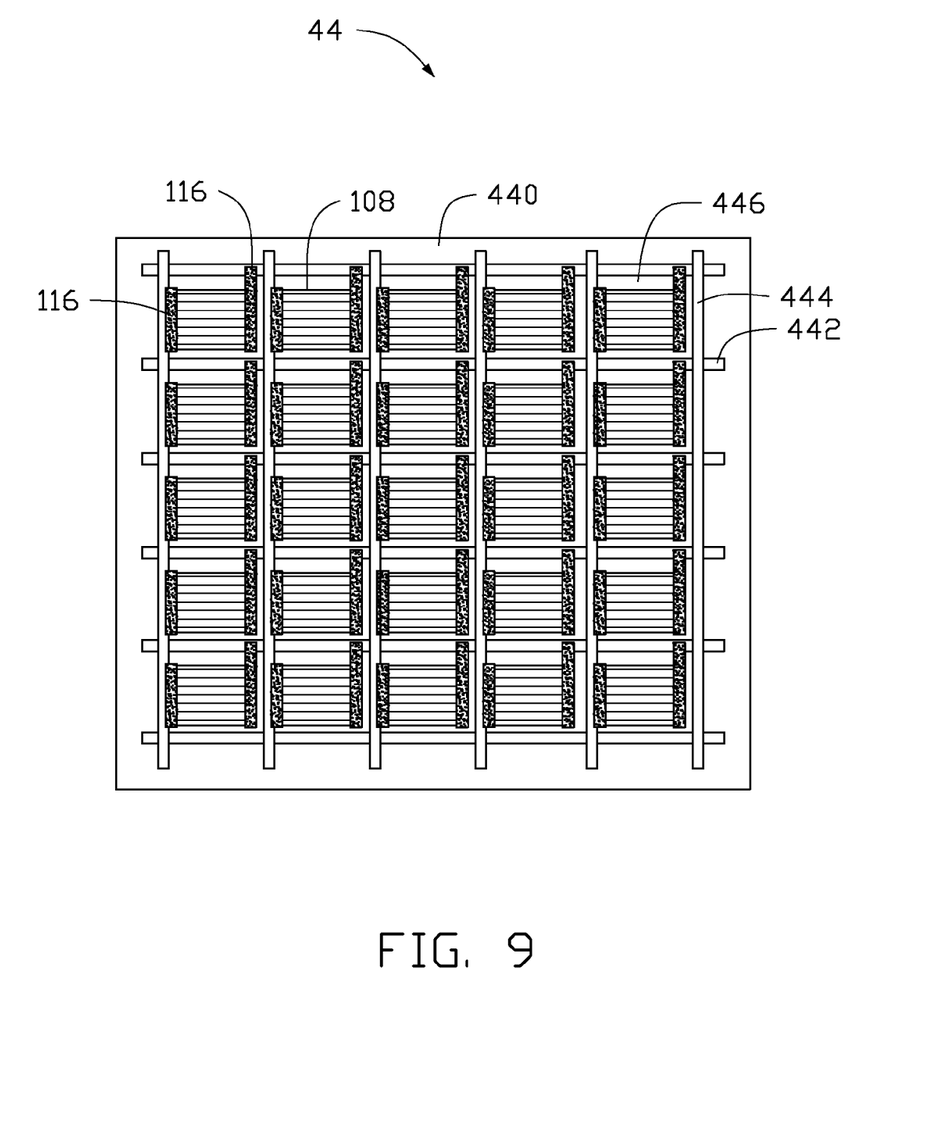
FIG. 9 is a top plan view of a second electrode sheet used in the chromatic display device in FIG. 7.

Referring to FIG. 9, the second electrode sheet 44 includes a second surface 440, a plurality of second row electrodes 442, a plurality of second line electrodes 444, and a plurality of second electrode cells 446. The structure of the second electrode sheet 44 is the same as the first electrode sheet 42. The second electrode sheet 44 can be transparent or opaque.

The first surface 420 of the first electrode sheet 42 faces the second surface 440 of the second electrode sheet 44. The first electrode cells 426 and the second electrode cells 446 are arranged opposite to each other in a one-to-one manner. Each first electrode cell 426 and each second electrode cell 446 are opposite to each other to define a display unit. Each display unit includes one chromatic element 100. Referring also to FIG. 2, the upper sheet 1022 of each chromatic element 100 is located on the first surface 420 and in one first electrode cell 426, and the lower sheet 1024 is located on the second surface 440 and in one second electrode cell 446 opposite the first electrode cell 426. Because the first heating element 106 is located on the first upper surface 1022a of the upper sheet 1022, the first heating element 106 of each chromatic element 100 is located in one first electrode cell 426. The two first electrodes 114 of the chromatic element 100 are electrically connected with the first row electrode 422 and the first line electrode 424 forming the electrode cell 426 in which the chromatic element 100 is located. Because the second heating element 108 is located on the second lower surface 1024b of the lower sheet 1024, the second heating element 108 of each chromatic element 100 is located in one second electrode cell 446. The two second electrodes 116 of the chromatic element 100 are electrically connected with the second row electrode 442 and the second line electrode 444 forming the electrode cell 446 in which the chromatic element 100 is located.

The chromatic display device 40 further includes at least one supporter located between the first electrode sheet 42 and the second electrode sheet 44. The at least one supporter maintains a distance between the first electrode sheet 42 and the second electrode sheet 44. The at least one supporter can prevent the chromatic element 100 from being pressed by the first electrode sheet 42 of the second electrode 44.

The chromatic display device 40 can control each chromatic element 100 with the first electrode sheet 42 and the second electrode sheet 44 to display or not display color. By controlling different chromatic elements 100, the chromatic display device 40 can show different information.

It is to be understood that the above-described embodiments are intended to illustrate rather than limit the present disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

What claimed is:

1. A chromatic element comprising:
a sealed enclosure defining a room and comprising a semitransparent upper sheet and a lower sheet;
a transparent first heating element disposed on the upper sheet;
a second heating element disposed on the lower sheet; and
a chromatic material layer located in the room, wherein the first heating element and the second heating element asynchronously produce heat, the chromatic material layer moving between the first heating element and the second heating element in response to the heat produced by the first heating element and the second heating element.

2. The chromatic element of claim 1, wherein the upper sheet comprises at least one rough surface.

3. The chromatic element of claim 1, wherein the upper sheet comprises a first upper surface located outside the sealed enclosure and a first lower surface opposite the first upper surface and located inside the enclosure, the first lower surface being a rough surface.

4. The chromatic element of claim 3, wherein the first upper surface is a rough surface.

5. The chromatic element of claim 3, wherein the first heating element is located on the first upper surface or the first lower surface of the upper sheet.

6. The chromatic element of claim 3, wherein the lower sheet comprises a second upper surface and a second lower surface opposite the second upper surface and located in the sealed enclosure, the second heating element is located on the second upper surface or the second lower surface.

7. The chromatic element of claim 1, wherein a light transmittance of the upper sheet is in a range from about 40% to about 80%.

8. The chromatic element of claim 1, wherein a material of the upper sheet is glass, polyethylene terephthalate, polyimide, polystyrene, polypropylene, polyethylene, polychloroprene, or PVC.

9. The chromatic element of claim 1, wherein the upper sheet is forested glass.

10. The chromatic element of claim 1, further comprising at least two first electrodes electrically connected with the first heating element and at least two second electrodes electrically connected with the second heating element.

11. The chromatic element of claim 10, wherein the first heating element and the second heating element are both positioned in the sealed enclosure, each of the first electrodes comprises a first extending portion extending out of the sealed enclosure, and each of the second electrodes comprises a second extending portion extending out of the sealed enclosure.

12. The chromatic element of claim 1, wherein the first heating element comprises a carbon nanotube layer structure, the carbon nanotube layer structure comprising at least one carbon nanotube film comprising a plurality of carbon nanotubes joined with each other via van der Waals attractive force.

13. The chromatic element of claim 12, wherein the plurality of carbon nanotubes in the at least one carbon nanotube film are oriented in a same direction, and the plurality of carbon nanotubes form a plurality of carbon nanotube segments joined end-to-end with each other in the same direction.

14. The chromatic element of claim 12, wherein the at least one carbon nanotube film is a substantially pure structure of carbon nanotubes.

15. The chromatic element of claim 1, wherein a material of the chromatic is iodine, naphthalin, indigo, or methyl violet.

16. A chromatic element comprising:
a sealed enclosure defining a room and comprising a lower sheet and a semitransparent upper sheet comprising at least one rough surface;

a transparent first heating element located at the upper sheet;

a second heating element disposed on the lower sheet; and a chromatic material layer located in the room and moving between the upper sheet and the lower sheet heated by the first heating element or the second heating element.

17. The chromatic element of claim 16, wherein the upper sheet comprises a first upper surface outside the sealed enclosure and a first lower surface inside the sealed enclosure and opposite the first upper surface; the first lower surface is a rough surface and the first heating element is located on the first upper surface.

18. The chromatic element of claim 16, wherein the first heating element comprises a carbon nanotube layer structure comprising a plurality of carbon nanotubes.

19. A chromatic display device comprising:

a first electrode sheet comprising a plurality of first row electrodes and a plurality of first line electrodes located on a surface of the first electrode sheet and crossed with each other to form a plurality of first electrode cells;

a second electrode sheet facing the first electrode sheet and comprising a plurality of second row electrodes and a plurality of second line electrodes located on a surface of the second electrode sheet and crossed with each other to form a plurality of second electrode cells, wherein the plurality of first electrode cells and the plurality of second electrode cells are arranged opposite with each other in a one-to-one manner to from a plurality of display units; and a plurality of chromatic elements located between the first electrode sheet and the second electrode sheet, each chromatic element located in one display unit and comprising:

a sealed enclosure defining a room and comprising a semitransparent upper sheet and a lower sheet;

a transparent first heating element positioned on the upper sheet;

a second heating element positioned on the lower sheet; and a chromatic material layer located in the room and moving between the upper sheet and the lower sheet by heat from the first heating element or the second heating element;

wherein the first heating element of each chromatic element is electrically connected with one first row electrode and one first line electrode, the second heating element is electrically connected with one second row electrode and one second line electrode.

20. The chromatic display device of claim 19, wherein the chromatic element further comprises two first electrodes located on a surface of the first heating element and two second electrodes located on a surface of the second heating element, the two first electrodes are separately electrically connected with the first row electrode and the first line electrode in one of the plurality of display units, and the two second electrodes are separately electrically connected with the second row electrode and the second line electrode in the one of the plurality of display units.

* * * * *